US011974953B2

(12) United States Patent
Mil et al.

(10) Patent No.: US 11,974,953 B2
(45) Date of Patent: May 7, 2024

(54) MEDICAL DEVICE FOR LEG SUPPORT

(71) Applicant: LINET spol. s.r.o., Slany (CZ)

(72) Inventors: Petr Mil, Baska (CZ); Bronislav Siuda, Trinec (CZ)

(73) Assignee: LINET spol. s.r.o, Slany (CZ)

( * ) Notice: Subject to any disclaimer, the term of this patent is extended or adjusted under 35 U.S.C. 154(b) by 967 days.

(21) Appl. No.: 16/333,074

(22) PCT Filed: Sep. 12, 2017

(86) PCT No.: PCT/CZ2017/050039
§ 371 (c)(1),
(2) Date: Mar. 13, 2019

(87) PCT Pub. No.: WO2018/054399
PCT Pub. Date: Mar. 29, 2018

(65) Prior Publication Data

US 2019/0262205 A1 Aug. 29, 2019

(30) Foreign Application Priority Data

Sep. 20, 2016 (CZ) ................................ CZ2016-583

(51) Int. Cl.
*A61G 13/00* (2006.01)
*A61G 13/12* (2006.01)
(Continued)

(52) U.S. Cl.
CPC ....... *A61G 13/125* (2013.01); *A61G 13/0009* (2013.01); *A61G 13/1245* (2013.01); *A61G 15/12* (2013.01); *A61G 15/005* (2013.01)

(58) Field of Classification Search
CPC ...... A61G 15/12; A61G 15/125; A61G 13/10; A61G 13/12; A61G 13/1235;
(Continued)

(56) References Cited

U.S. PATENT DOCUMENTS 2,652,221 A * 9/1953 Kampa .................. B60R 1/078 403/56
5,226,187 A 7/1993 Borders
(Continued)

FOREIGN PATENT DOCUMENTS

EP 1787618 A2 5/2007

OTHER PUBLICATIONS

WIPO, International Search Report, dated Jan. 2, 2018, in International Application No. PCT/CZ2017/050039, filed Sep. 12, 2017.
WIPO, Written Opinion, dated Jan. 2, 2018, in International Application No. PCT/CZ2017/050039, filed Sep. 12, 2017.

*Primary Examiner* — Adam Baker
(74) *Attorney, Agent, or Firm* — Thedford I. Hitaffer; Hitaffer & Hitaffer, PLLC

(57) ABSTRACT

The subject of the invention is a medical device for foot support related to a mechanism for attaching a calf support of the birthing bed, comprising a calf support (3) connected to a foot support (2) and a ball joint (5) connecting the calf support (3) and the foot support (2), wherein the ball part (5) comprises a pin (6) of the ball joint (5), a ball part (7) of the ball joint (5) and a housing (8), wherein the ball part (7) of the ball joint (5) is arranged in the housing (8), the medical device further comprising a pressing element (9) and a pre-biased spring (10), characterized in that the pre-biased spring (10) is arranged between the pressing element (9) and the fixed part (11) of the calf support (3), wherein at the end distant from the ball part (7) of the ball joint (5) the pre-biased spring abuts to adjacent fixed part (11) of the calf support (3) and at the end near the ball part (7) of the ball joint (5) it abuts to the movable pressing element (9) which is connected with the control member.

20 Claims, 3 Drawing Sheets

(51) Int. Cl.
*A61G 15/12* (2006.01)
*A61G 15/00* (2006.01)

(58) Field of Classification Search
CPC ............ A61G 13/1245; A61G 13/1285; A61G 13/128; A61G 13/129; A61G 13/101; A61G 13/1205–1255; A61G 13/0036; A61G 13/0063; A61G 13/009; A61G 13/125; A61G 7/065; A61G 7/075; A61G 7/0755; A61G 7/1082; A61G 7/1096; A61G 7/109; A61G 7/1092; A61G 7/1094; A61G 2200/32; A61F 5/37; A61F 5/3761; A61F 5/3769; A61F 5/3792; A47C 7/50–52
USPC .......................................................... 128/845
See application file for complete search history.

(56) References Cited

U.S. PATENT DOCUMENTS

| | | | | | |
|---|---|---|---|---|---|
| 5,661,859 | A * | 9/1997 | Schaefer | A61G 13/08 | 5/632 |
| 5,926,878 | A * | 7/1999 | Morton | A61G 7/0755 | 5/624 |
| 6,540,193 | B1 * | 4/2003 | DeLine | B60R 1/04 | 248/483 |
| 7,581,266 | B2 | 9/2009 | Krecow et al. | | |
| 2003/0182727 | A1 * | 10/2003 | DuDonis | A47C 20/021 | 5/648 |
| 2009/0000033 | A1 * | 1/2009 | Hempker | A61G 15/12 | 5/613 |
| 2010/0039052 | A1 * | 2/2010 | Horst | A61H 1/0237 | 318/8 |

* cited by examiner

MEDICAL DEVICE FOR LEG SUPPORT

FIELD OF INVENTION

The invention relates to a mechanism for attaching a calf support for the obstetric beds.

STATE OF THE ART

In the present state of the art, there is a known system, in which the position of a calf support is adjusted by means of a system of a pivot pin housed in a hub, wherein the hub mechanism is designed so as to allow fixing the shaft in various positions. The system is highly limiting due to necessity to use multiple systems to achieve the same number of degrees of freedom as with a ball joint.

The above-described state of the art has been overcome by using a ball joint to adjust the position of a calf support, which improves manipulation with the calf support.

In the present state of the art, there is a known system using a pressing mechanism with a thrust rod to secure and prevent the ball joint from moving. The system is described in EP1286640 and comprises a ball joint and a thrust rod arranged in a housing together with the ball joint. The thrust rod is provided with a handle on one of its ends. The handle allows rotation of the thrust rod and thus increasing the force acting on the ball joint. However, these systems are time-consuming and in case of insufficient force due to insufficient securing, uncontrolled movement of the calf support may occur, which is undesirable for a birthing bed.

In the present state of the art, there is a known system utilizing the pressing mechanism with a spring for securing the ball joint and prevent it from movement. The system is described in patent EP1787618, comprising a ball joint, a spring and a cam coupled to a handle. The cam pressing the spring rotates simultaneously with the handle, thus securing the joint against movement. This system is not advantageous due to necessity to rotate the handle into a position, in which the ball joint is secured, and this may result into undesirable situation, when the ball joint is not secured, causing uncontrollable movement of the calf support, which is not desired in case of birthing bed. Another drawback lies in the necessity to use one hand to adjust the position of the calf support and the other hand to secure the joint, which is not desirable, especially in the medical environment.

SUMMARY OF THE INVENTION

The above-mentioned drawbacks are eliminated by a medical device for foot support of a patient, comprising a calf support coupled with the foot support and a ball joint. The calf support is coupled with the foot support by means of the ball joint. The ball joint includes a ball joint pin, a ball part of the ball joint and a housing. The ball part of the ball joint is provided in the housing. The medical device further includes a pressing element and a pre-biased spring. The advantage is characterized in that the pre-biased spring is arranged between the pressing element and the fixed part of the calf support. At the end distant from the ball joint, the pre-biased spring abuts to the adjacent fixed part of the calf support and at the end close to the ball part of the ball joint, it abuts to the movable pressing element. The movable pressing element is connected with the control member. This is applicable for increasing security thanks to the fact that usage of a pre-biased spring prevents situations causing uncontrollable movement from happening.

It is preferably utilized that the pressing element may be set in two positions. In the first position, the pressing element exerts greater pressure on the ball part of the ball joint than it does in the second position.

It is preferably utilized that the medical device further comprises a rod forming the connection between the pressing element and the control member.

It is preferably utilized that the control member is a system of levers.

It is preferably utilized that the force exerted by the spring on the ball part of the ball joint is from 500 N to 2500 N.

It is preferably utilized that the system of levers has a gear ratio from 1:15 to 1:90.

It is preferably utilized that the system of levers comprises a first arm of the system of levers provided with a handle, a second arm of the system of levers rotationally coupled with the first arm of the system of levers, a third arm of the system of levers rotationally coupled with the second arm of the system of levers and a first pivoting point fixedly coupled with the calf support and rotationally coupled with the first arm of the system of levers, a second pivoting point fixedly coupled with the calf support and rotationally coupled with the third arm of the system of levers.

It is preferably utilized that the connection of the positionable arm with the foot support is translational and the connection of the foot support with the central segment is rotational.

A preferable method of using the medical device is characterized in that the pressing element in its first latching position exerts pressure on the ball part of the ball joint. Manual activation of the control member causes shifting of the rod, thanks to which the pressing element shifts away from the ball part of the ball joint into the second position. Shifting of the pressing element simultaneously causes compression of the pre-biased spring. In the second position, the pressing element exerts lower pressure on the ball part of the ball joint than in the first latching position.

Preferred method of using the medical device is characterized in that upon activation of the control element using one hand, the calf support can be gripped and adjusted to a required position in the range allowed by the ball joint.

The method of using is especially advantageous due to necessity to use only one hand, thanks to which it is possible to, for example, adjust both calf supports at the same time, improving the manipulation with the calf supports, being especially advantageous in obstetrics.

DESCRIPTION OF EXEMPLARY EMBODIMENTS

Figure 1:
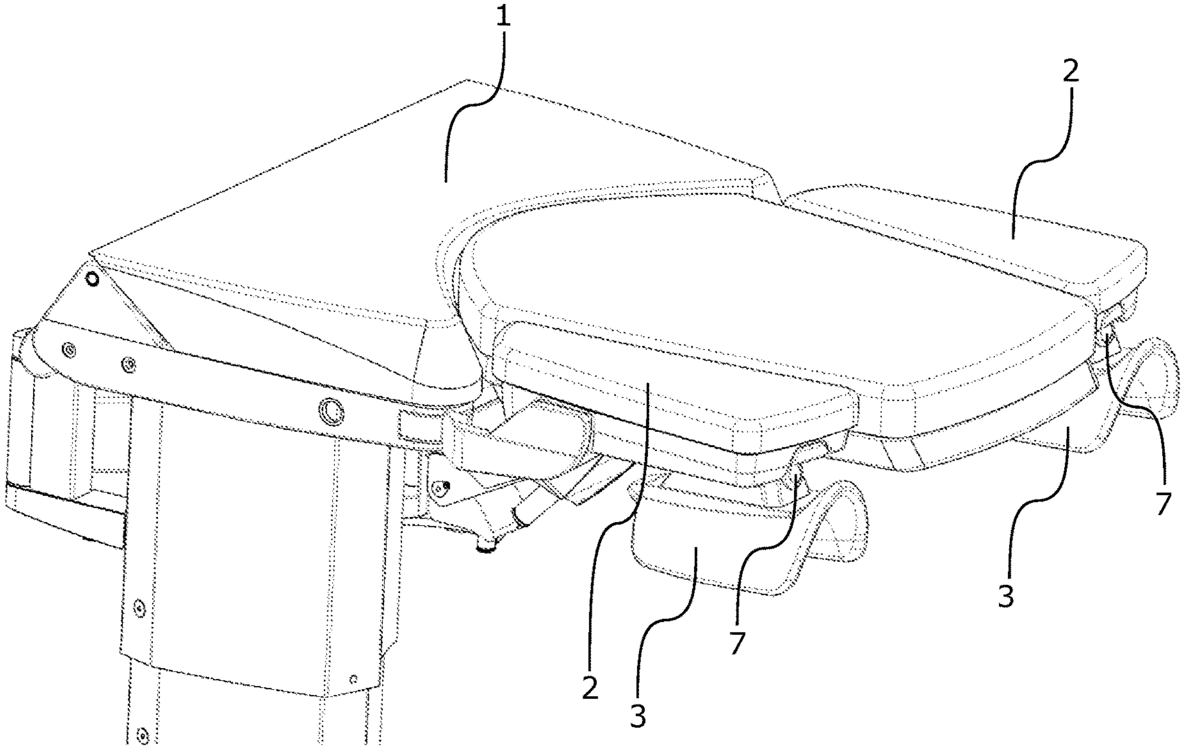
FIG. 1 is a front perspective view of a medical device for supporting the legs of a patient.

An exemplary embodiment of the present invention is a medical device for foot support, e.g. birthing bed or gynecological examination bed. Part of the medical device is a rest area, which is arranged, e.g. on a column drive or a scissor lift, provided on a chassis frame. The column drive may be one-column or multiple-column drive.

The column drive may consist of a plurality of concentric columns, wherein each of them, except the column provided nearest to the chassis frame, comprises a motor serving for driving the particular column.

A part of the rest area is a detachable padding. The padding is adapted for easy maintenance. The padding may be, for example, a layer of soft material for interaction with the patient's body. The padding consists, for example, of a foam layer of foamed polyurethane, cold foam or combinations thereof. The foam layer is provided in a washable wrapping.

The chassis frame comprises wheels, at least three, or preferably four wheels, and in order to improve manipulation even fifth central wheel may be added. The wheels may also comprise a brake system, which may be electrically, mechanically or hydraulically controlled. Activation of the brake system may be initiated by means of a manual controller, foot controller or it may be initiated automatically after certain time period during which the medical device is static, or combinations thereof.

An infusion stand holder may be rotatable arranged on the chassis frame. The infusion stand holder may be rotatable, moving between the inactive and active position. In the active position, an infusion stand may be inserted into the infusion stand holder. In the inactive position, the infusion stand holder does not protrude from the chassis frame, which eliminates the risk of tripping over the holder.

The rest area may consist of, for example, a back segment, a central segment 1 and a foot segment. These segments may consist of, for example, two or more castings as well as a top and a bottom surface. The top and the bottom surfaces may be made of, for example, shaped sheet metal. The castings may be mutually connected, for example, by means of welding, screwing, riveting or by gluing to form a central part. The central part is connected to the top or the bottom surface, for example, by means of welding, screwing, riveting or gluing. Connection of the top and the bottom surface forms a closed-area part. By means of closing, a space is created inside the part, which is suitable, e.g. for guiding the wires, and the surface can be maintained more easily.

The back segment may be provided with a lateral barrier, which is rotatably attached to the back segment structure. The lateral barrier has two end positions—an active and an inactive position. The active position means that the barrier prevents the patient from leaving the bed unintentionally, this is typically a position with the barrier arranged above the rest area. In the inactive position, the barrier with all its volume does not exceed the height of the rest area of the bed. The lateral barrier is latched in the active position. Unlatching from the active position is performed by pressing a button, which is connected to a set of rods, and by rotating the barrier into the inactive position around the pivoting point. The button for unlatching is provided on the outside surface of the lateral barrier, so that it cannot be reached by a patient, which increases security.

The bed is further provided with a mechanical CPR (Cardiopulmonary resuscitation) system. The back segment may be on its bottom provided with a spring, e.g. a hydraulic or gas spring, and it may be further provided with a linear drive for tilting of the back segment. The spring is attached on one of its sides to the central segment 1 and on the other side to the back segment. The spring is configurated so that it prevents the back segment from moving below the level of the central segment 1. When pressing the button or a CPR lever, the motor unlatches from the back segment. By unlatching the motor driving the back segment, the back segment drops down into the same level as the central segment 1.

The back segment may be provided with a detachable headboard. The headboard is on its bottom side provided with spikes having grooves. The back segment is provided with openings for the spikes. The headboard is attached to the back segment structure by inserting the spikes to the spike openings. After inserting the spikes to the spike openings in the back segment, latching occurs by means of, e.g. wire mechanism, which latches into the grooves made in the spikes. The back segment is provided on its bottom side with a button for unlatching the headboard. An element is connected to the button for unlatching of the headboard, which unlatches the spikes arranged in the wire mechanism after pressing the button, and subsequently it is possible to detach the headboard from the back segment.

The foot segment comprises a foot portion and a foot support 2. The foot portion may be rotatable, e.g. around a column drive, or it may be detachable. The foot segment may be adjustable in height and it may also have adjustable tilt angle.

Figure 2:
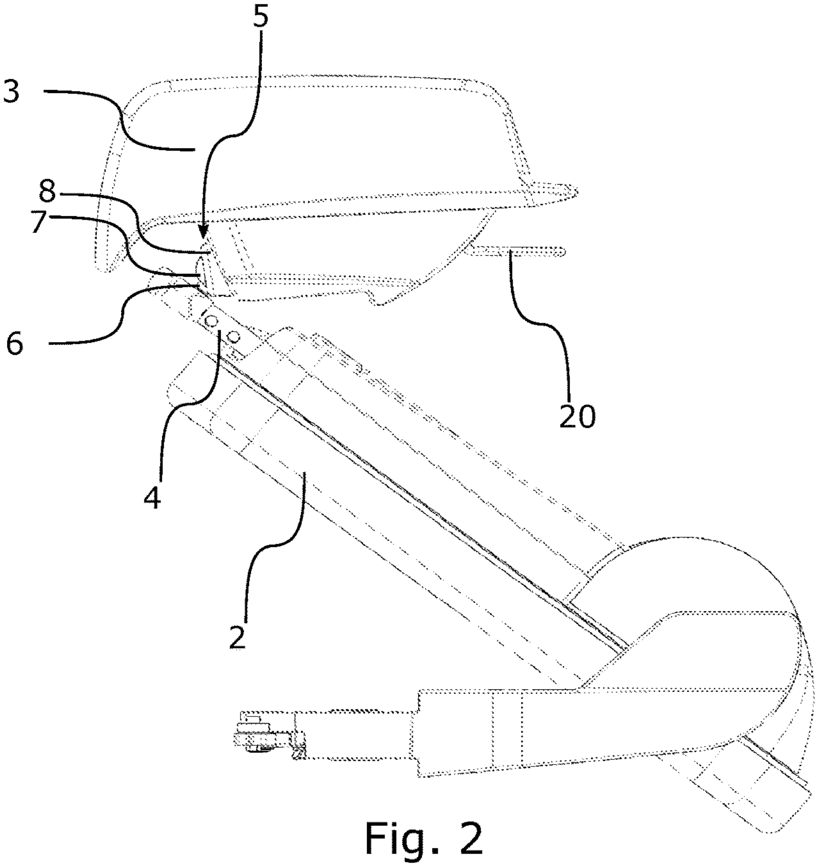
FIG. 2 is a side elevational view of the medical device shown in relevant part with a calf support thereof deployed for supporting the leg of a patient.
Figure 3:
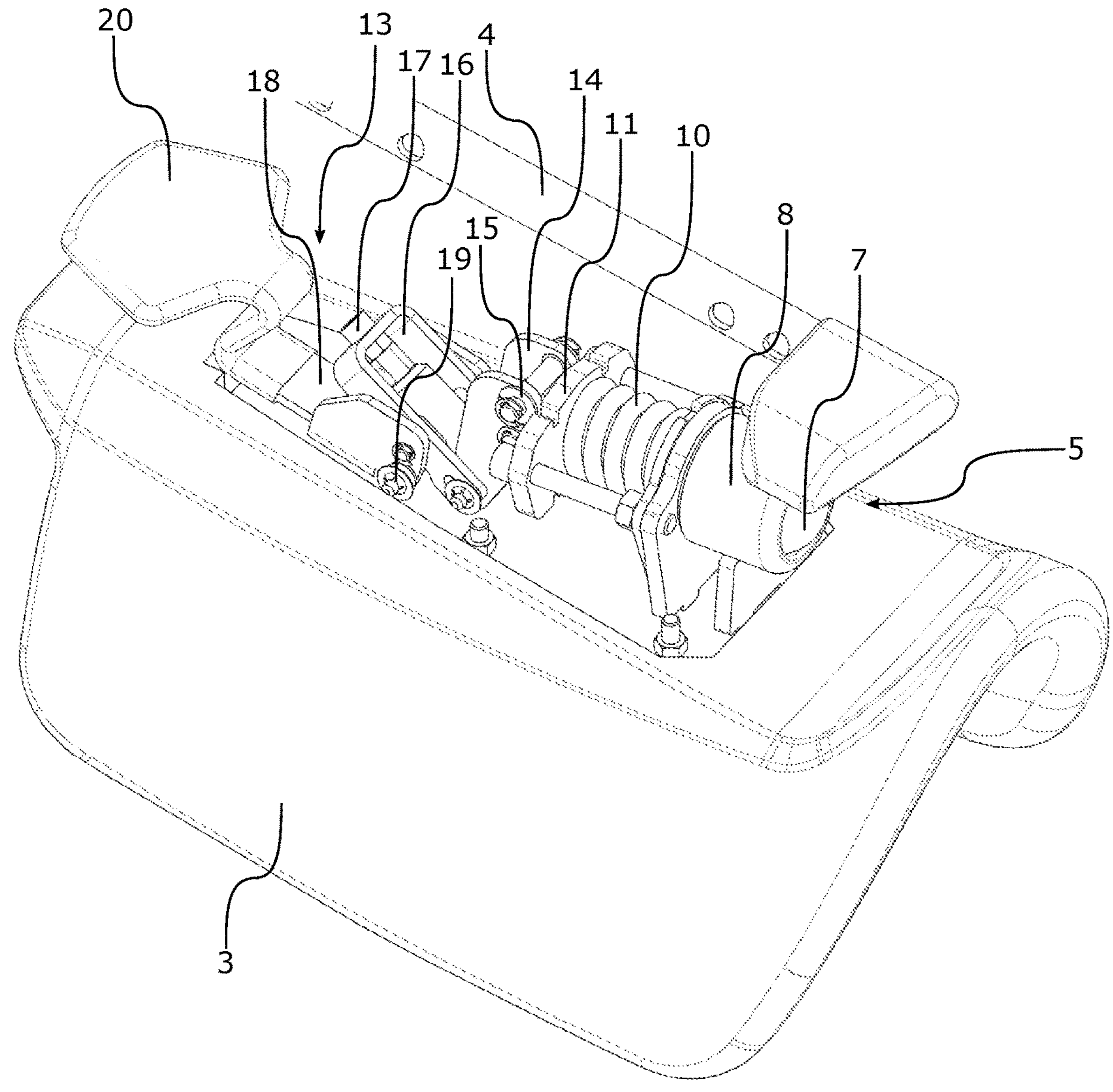
FIG. 3 is an enlarged bottom perspective view of calf support and an exemplary system for controlling the calf support.

The medical device for leg support according to the FIGS. 1 and 2 comprises foot supports 2 connected with the central segment 1. The foot supports 2 support the feet in one position, and form a part of the rest area in the second horizontal position, wherein in this exemplary embodiment they are connected on one of their sides with an arm to the central segment 1 and on the other side to the calf supports 3. Connection of the foot supports 2 with the central segment 1 is performed by means of a joint provided with a latching system. The calf supports 2 are connected with the foot support 2 by means of a ball joint 5. The ball joint 5 consists of a pin 6 of the ball joint 5, connected with the positionable arm 4 on one side and from the ball part 7 of the ball joint 5 arranged inside the housing 8 on the other side. The positionable arm 4 is located on the opposite side of the foot support 2 from the padding. The positionable arm 4 allows translational adjustment of the calf supports 3. The supporting part of the foot support 3 has a shape suitable for comfortable placing of calves, for example, in the shape of U. Further, as it is illustrated in the FIGS. 3, 4 and 5, a fixed part 11 of the calf support 3 is a part of the calf support 3, wherein the fixed part 11 of the calf support 3 may be an integral part of the calf support 3 or a part attached to the calf support 3. A pre-biased spring 10 abuts to the fixed part 11 of the calf support, while it also abuts to the movable pressing element on its other side. Pre-biasing of the spring 10 is between 500 N and 2500 N. The pressing element 9 is fixedly connected to the rod 12. The fixed part 11 of the calf support 3 is provided with an opening for guiding the rod 12, in which the rod 12 is translationally moving. The rod 12 is connected with the control member, represented in this exemplary embodiment by a system 13 of levers. In this exemplary embodiment, the system 13 of levers comprises the first arm 18 of the system 13 of levers provided with the handle 20, the second arm 16 of the system 13 of levers, the first pivoting point 19 and the second pivoting point 15. The first arm 18 of the system 13 of levers is rotatably connected with the second arm 16 of the system 13 of levers and at the same time rotatably connected with the first pivoting point 19. The first pivoting point 19 is fixedly connected with the calf support 3. The second arm 16 of the system 13 of levers is rotatably connected with the third arm 14 of the system 13 of levers. The third arm 14 of the system 13 of levers is rotatably connected to the second pivoting point 15 which is fixedly connected with the calf support 3. The third arm 14 of the system 13 of levers is at the same time connected with the rod 12. The second arm 16 of the system 13 of levers comprises a calibration screw 17, thanks to which, depending on its tightening, a service engineer may change the position of the first arm 18 of the system 13 of levers, and thus also position of the handle 20. Depending on the chosen system 13 of levers, characterized by its arrangement and dimensions of the particular arms, the system 13 of levers engages the rod 12 with a gear ration between 1:15 and 1:90. In this exemplary embodiment, the pressing element 9, which is arranged inside the housing 8, transmits the force of the spring 10 to the ball part 7 of the ball joint 5. In alternative embodiments, the system 13 of levers, the rod 12 and the spring 10 may be replaced by a hydraulic system, pneumatic system or electrical system, acting on the pressing element 9 with force.

Figure 4:
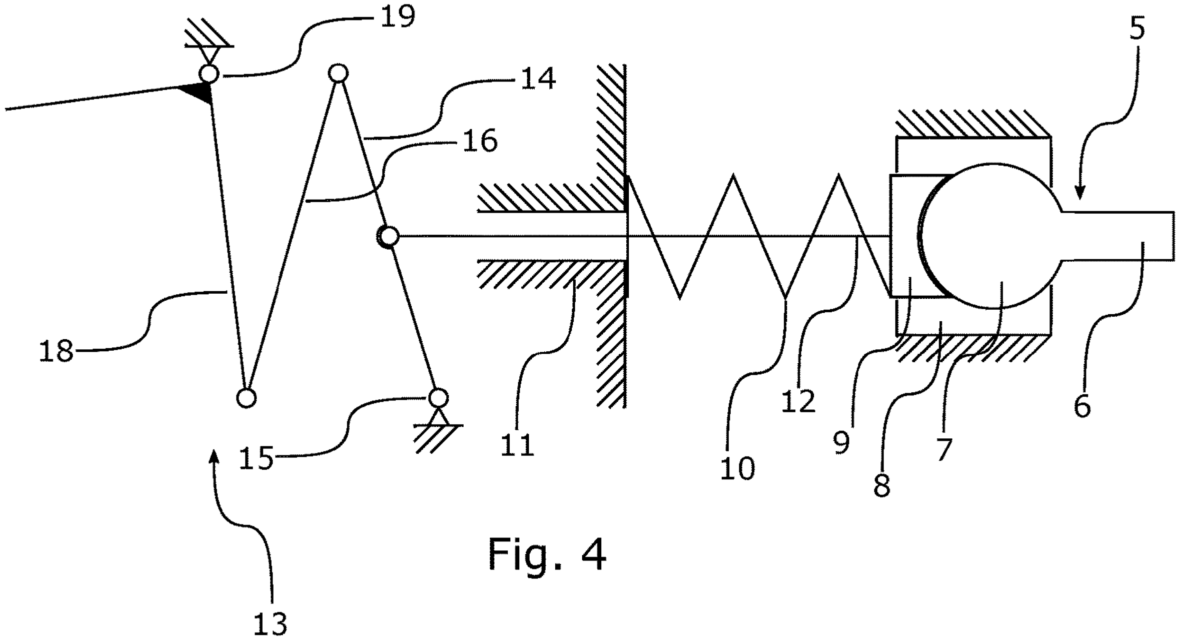
FIG. 4 is a diagrammatic representation of the system shown in FIG. 3 operable to hold the calf support in a fixed position.
Figure 5:
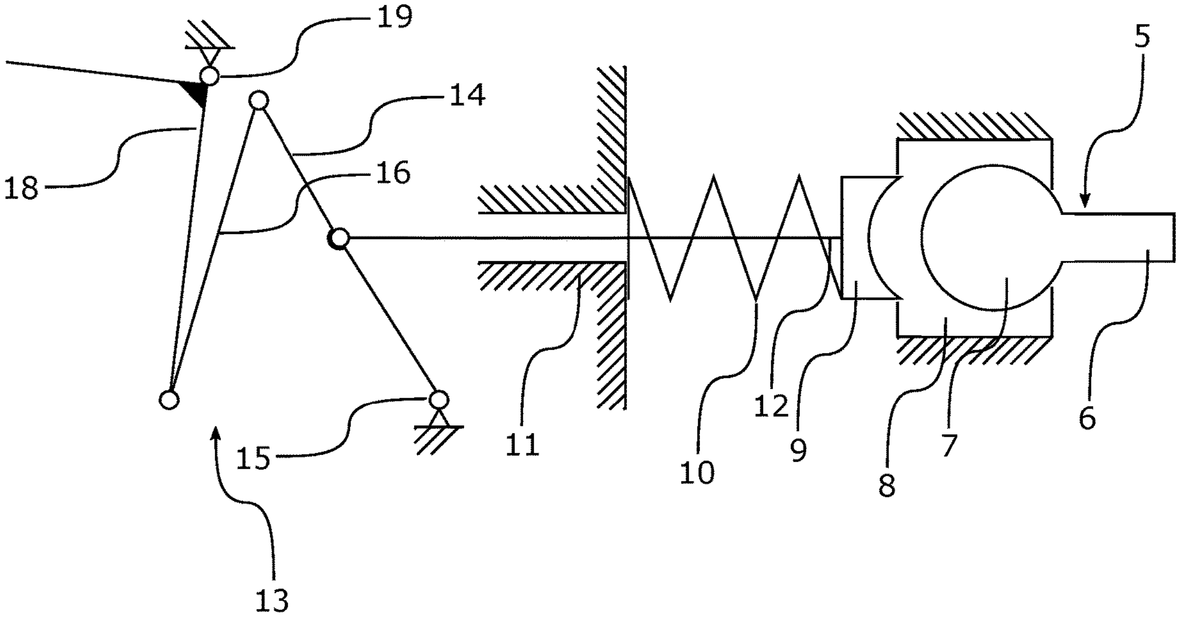
FIG. 5 is a diagrammatic representation of the system shown in FIG. 3 operable to release the calf support from the fixed position.

As it is illustrated in the FIG. 4, in the first latching position the pressing element 9 exerts pressure on the ball part 7 of the ball joint 5. As it is illustrated in the FIG. 5, translational movement of the rod 12 away from the ball part 7 of the ball joint 5 causes movement of the rod 12 to the second position, causing release of pressure of the pressing element 9 onto the ball part 7 of the ball joint 5. Release of pressure of the pressing element 9 onto the ball part 7 of the ball joint 5 is achieved by action of the pressing element 9 coupled with the rod 12 against pressure of the spring 10, thus in the direction away from the ball part 7 of the ball joint 5. By releasing the pressure of the pressing element 9 the ball part 7 is released and it is possible to set the position of the calf support 3. Translational movement of the rod 12 is mechanically associated with the rotational movement of the handle 20. The rotational movement of the handle 20 causes rotation of the first arm 18 of the system 13 of levers around the first pivoting point 19. Rotation of the first arm 18 of the system 13 of levers around the first pivoting point 19 causes translational-rotational movement of the second arm 16 of the system 13 of levers. Translational-rotational movement of the second arm 16 of the system 13 of levers causes rotational movement of the third arm 14 of the system 13 of levers. Rotational movement of the third arm 14 of the system 13 of levers causes substantially translational movement of the rod 12.

The housing 8, the first pivoting point 19 and the second pivoting point 15 are firmly attached to the calf support 3. The handle 20 of the control element is arranged near the handle part of the calf support 3, so that by pressing the handle 20 with a thumb of one hand and the handle part of the calf support 3 with fingers of the same hand the ball joint 5 is released and at the same time the calf support 3 is gripped. This arrangement allows releasing the ball joint 5 and setting the calf support 3 into the required position with one hand. In the assembled horizontal position, the foot supports 2 are in the same plane as the central segment 1 and the calf supports 3 are provided below the foot supports 2 so that they do not exceed with any of their parts the floor plan of the foot supports 2. In the active position, the foot supports 2 are rotated into a position allowing the setting of the calf supports 3 into a position allowing resting the patient's calves on the calf supports 3.

LIST OF REFERENCE SIGNS

1 central segment
2 foot support
3 calf support
4 positionable arm
5 ball joint
6 ball joint pin
7 ball part of the ball joint
8 housing
9 pressing element
10 spring
11 fixed part of the calf support
12 rod
13 system of levers
14 third arm of the system of levers
15 second pivoting point
16 second arm of the system of levers
17 calibration screw
18 first arm of the system of levers
19 first pivoting point
20 handle

The invention claimed is:

1. A medical device for patient's foot support comprising a calf support coupled to a foot support and a ball joint connecting the calf support and the foot support, wherein the ball joint provides three rotational degrees of freedom and comprises a pin of the ball joint, a ball part of the ball joint and a housing, and wherein the ball part of the ball joint is arranged in the housing, the medical device further comprising a control member, a pressing element and a pre-biased spring, wherein the pre-biased spring is arranged between the pressing element and a fixed part of the calf support, and wherein, at an end distant from the ball part of the ball joint, the pre-biased spring abuts the fixed part of the calf support, and at an end near to the ball part of the ball joint, the pre-biased spring abuts the movable pressing element, which is coupled with the control member, wherein the pre-biased spring is operable to exert force on the pressing element to move the pressing element to press against an outer surface of the ball part and exert pressure on the ball part to releasably fix the calf support in a set position.

2. The medical device for foot support according to claim 1, wherein the pressing element may be set into two positions, including a first position and a second position, wherein, in the first position, the pressing element exerts greater pressure on the ball part of the ball joint than in the second position.

3. The medical device for foot support according to claim 1 further comprising a rod forming a connection between the pressing element and the control member.

4. The medical device for foot support according to claim 1, wherein the control member is a system of levers.

5. The medical device for foot support according to claim 4, wherein the system of levers has a gear ratio from 1:15 to 1:90.

6. The medical device for foot support according to claim 4, wherein the system of levers comprises a first arm of the system of levers provided with a handle, a second arm of the system of levers rotationally coupled with the first arm of the system of levers, a third arm of the system of levers rotationally coupled with the second arm of the system of levers, a first pivoting point fixedly coupled with the calf support and rotationally coupled with the first arm of the system of levers, and a second pivoting point fixedly coupled with the calf support and rotationally coupled with the third arm of the system of levers.

7. The medical device for foot support according to claim 1, wherein the force exerted by the spring to move the pressing element to press against the outer surface of the ball part of the ball joint is in a range from 500 N to 2500 N.

8. The medical device for foot support according to claim 1, further comprising a positionable arm connected with the foot support with a translational connection, and a central segment connected to the foot support with a rotational connection.

9. A method for using the medical device according to claim 1, wherein the pressing element in a first latching position exerts pressure on the ball part of the ball joint, and manual activation of the control member causes movement of the pressing element away from the ball part of the ball joint to a second position, simultaneously causing compression of the pre-biased spring, and wherein, in the second position, the pressing element exerts lower pressure on the ball part of the ball joint than in the first latching position.

10. The method for using the medical device according to claim 9, wherein the control member is activatable with one hand to permit the calf support to be simultaneously grabbed and set into a position in a range allowed by the ball joint.

11. A medical device comprising a patient's foot support, the device comprising:

a calf support having a generally U-shaped support part for comfortable placement of a calf of the patient and supporting a fixed part in fixed relation to the calf support, a foot support for supporting a foot of the patient, a ball joint supported in relation to the calf support for connecting the calf support and the foot support, a pressing element supported for movement in relation to the calf support, a pre-biased spring arranged between the pressing element and a fixed part with a distal end of the pre-biased spring abutting the pressing element and a proximal end of the pre-biased spring abutting the fixed part, and a control member coupled to the pressing element to control movement of the pressing element against pressure of the pre-biased spring, wherein the pre-biased spring is operable to exert a force on the pressing element to move the pressing element to press against an outer surface of the ball part and exert pressure on the ball part to releasably fix the calf support in a set position.

12. The medical device for foot support according to claim 11, wherein the pressing element may be set into two positions, including a first position and a second position, wherein the pressing elements exert greater pressure on the ball joint in the first position than in the second position.

13. The medical device for foot support according to claim 11 further comprising a rod forming a connection between the pressing element and the control member to permit the control member to control the pressure element at a remote distance from the pressure member.

14. The medical device for foot support according to claim 11, wherein the control member comprises a system of levers.

15. The medical device for foot support according to claim 14, wherein the system of levers has a gear ratio from 1:15 to 1:90.

16. The medical device for foot support according to claim 14, wherein the system of levers comprises a first arm provided with a handle, a second arm rotationally coupled with the first arm, a third arm rotationally coupled with the second arm, a first pivot point fixedly coupled with the calf support and rotationally coupled with the first arm, and a second pivot point fixedly coupled with the calf support and rotationally coupled with the third arm.

17. The medical device for foot support according to claim 11, wherein the force exerted by the pre-biased spring to move the pressing element to press against the outer surface of the ball joint is in a range from 500 N to 2500 N.

18. The medical device for foot support according to claim 11, further comprising:

a positionable arm connected with the foot support with a translational connection, and a central segment connected with the foot support with a rotational connection.

19. A method for using the medical device according to claim 11, wherein the pressing element in a first latching position exerts a first pressure on the ball joint, and manual activation of the control member causes movement of the pressing element away from the ball joint to a second position, simultaneously causing compression of the pre-biased spring, and wherein, in the second position, the pressing element exerts a second pressure on the ball joint that is lower than the first pressure.

20. The method for using the medical device according to claim 19, wherein during activation of the control member with one hand, the calf support is simultaneously grabbable and may be set into a required position in the range allowed by the ball joint.

* * * * *